United States Patent [19]

Hamisch et al.

[11] 4,379,404

[45] Apr. 12, 1983

[54] PIEZOELECTRIC ENGINE-KNOCK SENSOR

[75] Inventors: Hans J. Hamisch; Manfred Boruschweitz; Theodor Gast, all of Berlin, Fed. Rep. of Germany

[73] Assignee: Robert Bosch GmbH, Stuttgart, Fed. Rep. of Germany

[21] Appl. No.: 236,907

[22] Filed: Feb. 23, 1981

[30] Foreign Application Priority Data

Feb. 22, 1980 [DE] Fed. Rep. of Germany ....... 3006655
Mar. 7, 1980 [DE] Fed. Rep. of Germany ....... 3008780

[51] Int. Cl.³ .............................. G01L 23/22
[52] U.S. Cl. .......................... 73/35; 73/651; 310/329
[58] Field of Search .................. 73/35, 651; 123/425, 123/435; 310/328, 329, 330, 323

[56] References Cited

U.S. PATENT DOCUMENTS 2,722,614  11/1955  Fryklund ............... 310/323
3,336,529  8/1967  Tygart ................. 310/323
4,305,013  12/1981  Baier et al. ........... 310/330

FOREIGN PATENT DOCUMENTS 806800  6/1951  Fed. Rep. of Germany ........ 73/651

Primary Examiner—James J. Gill
Attorney, Agent, or Firm—Frishauf, Holtz, Goodman & Woodward

[57] ABSTRACT

A metallic reed clamped against a piezoelectric element, and free to oscillate at its other end, generates electrical signals in a piezoelectric element which is held between clamp surfaces in fixed relation to an engine part which transmits engine knock vibrations to the sensor assembly. The reed is oriented perpendicular to the vibratory motions of the engine part on which it is mounted, so that vibrations of the reed will be excited thereby, and these will deform the piezoelectric element to generate signals. The entire assembly can be enclosed in a transverse bore in the head of a cylinder head screw.

8 Claims, 4 Drawing Figures

PIEZOELECTRIC ENGINE-KNOCK SENSOR

The invention concerns a sensor for detecting the occurrence of knocks in a cylinder of an internal combustion engine, and particularly a sensor of the kind utilizing a piezoelectric element to provide an electrical signal as soon as the engine begins to knock.

It is known that a so-called knock occurs under particular operating conditions in Otto engines, a class of engine that includes a conventional four-stroke internal combustion engines. These knocks are sonic frequency vibrations of the compressed fuel-air mixture that are produced by a shock wave. During these oscillations, the heat transfer to the piston and cylinder walls is greatly increased. This produces a damaging thermal overload on these surfaces, so that engine knocks are basically to be avoided. Since it is nevertheless desired to utilize, as far as possible, the existing versatility of the mode of operation, there is interest in a sensor that provides a knock warning early and reliably.

It is already known, from German patent publication DE-OS No. 28 01 969, which corresponds to allowed U.S. patent application Ser. No. 600,038, filed Jan. 16, 1979, to use a vibrating flexure member for the measuring of the knocking of an Otto engine. As the vibrating member, held at one end in the manner of a vibrating reed, a piezoelectric element was there proposed. Piezoelectric elements, however, are very brittle, so that both in the process of manufacture and also in operation under heavy load they break easily. This has the disadvantage that in the production of knock sensors so constituted, the proportion of rejects is very high and, further, the sensors become inoperative through breakage under strong loading in operation, for example, from hard shocks affecting the motor when the vehicle it drives hits a pothole or other sharp unevenness of the road.

The Invention

It is an object of this invention to provide a piezoelectric engine-known sensor in which the piezoelectric element is not subject to serious risk of breakage.

Briefly, a tubular body of piezoelectric material is held in a bore or a cylindrical casing between a stop shoulder in the casing and the lateral base extension of an otherwise axial vibrating member. A helical spring is advantageously used to hold the foot extensions of the vibrating member against a piezoelectric element that is clamped into place. A pair of electrodes on diammetrically opposite cylindrical walls of the piezoelectric body are aligned axially with the foot extensions of the vibrating member.

The elastic material of which the vibrating element is made is preferably spring steel.

The sensors of the present invention have the advantage that the choice of the flexure vibrator material is left open, so that it can be chosen so as to meet special loading conditions better. In this way, rejections in the manufacturing process can be minimized and the reliability of the completed sensor can be improved. The vibrating member can be produced by a stamping operation. The choice of the geometry of the ceramic piezoelectric converter is not limited by resonance requirements. Requirements of higher stability and simpler manufacturing can thus be better fulfilled.

If it is desirable to damp the vibrating member in pauses between measurements, it is advantageous that the forces transmitted by the vibrator to the piezoelectric element should be concentrated, not on mere edges, but rather on end surfaces of the ceramic tube. The vibrating member in such a case, with its coupling member, is pressed with external spring force against the ceramic plate and can then be easily replaced or interchanged, especially in the case of a helical spring. In order that the clamping pressure should be not be made too great, it is then desirable for a mounting shoulder and insulating support wafer to provide a form fit.

In order that the sensors may be connected to the internal combustion engine as solidly as possible, it is desirable to provide the sensor unit in a cylindrical bore in a machine element firmly bonded or connected in the engine. The construction in which the unit is placed in a transverse bore in the head of a machine screw in the cylinder head has been found particularly simple and advantageous. For avoidance of dirt and of damping of the spring and of the vibrating member, it is useful to fill the cylindrical bore with a damping liquid and to seal the bore tight at its ends.

THE DRAWING

The invention is further described by way of illustrative example with reference to the annexed drawings, in which.

DESCRIPTION OF THE ILLUSTRATED EMBODIMENTS

Figure 1:
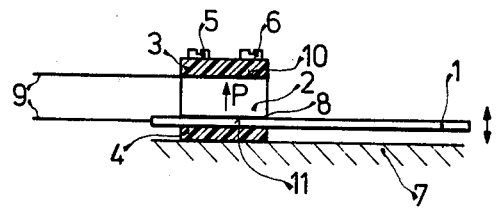
FIG. 1 and FIG. 2 are schematic cross-sectional diagrams of diferent embodiments of a simple form of knock sensor.

A flexure vibrator of spring steel 1, which may be referred to as a vibrating reed, is clampd together with a piezoelectric ceramic plate 2 in a clamping structure. The latter is composed of two small insulating plates 3 and 4, operating as clamp jaws, and two screws 5 and 6, which press the reed spring 7 and the piezoelectric element 2 against the schematically shown engine part 7. The engine part 7, to which the sensor is rigidly connected, transmits the engine knock noise generated in the internal combustion engine of which it is a part. The vibrating reed 1 is oriented perpendicularly to the direction of oscilation of the massie part 7 of the internal combustion engine. The vibrations of the reed 1, excited by the oscilations of the engine part 7, elastically deform the piezoelectric element 3 in its clamp, particularly in the region of its edge 8, so that an electrical signal proportional to the transverse force can be picked up by the connecting leads 9.

The pickup of the voltage is made possible by the fact that the piezoelectric element is made to be conducting on its longitudinal sides 10 and 11, for example, by vapor deposition of a conductor or by the provision of metallic surfaces. As a metallic surface for the side 11, in particular, there can be used the reed 1 itself.

Figure 2:
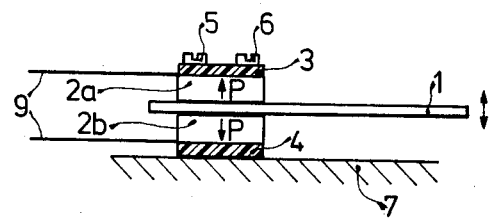

FIG. 2 shows another illustrative embodiment of an engine knock sensor having piezoelectric element. On both sides of the reed 1 there are disposed piezoelectric elements 2a and 2b, the respective polarization directions P of which are opposed to each other. The reed 1 and the piezoelectric elements 2a and 2b are fastened between the two insulating plates 3 and 4 by the screws 5 and 6 which also affix the resulting structure to the schematically illustrated engine part 7. The manner of operation of this device is the same as described in connection with FIG. 1.

The sum of the voltages generated by the two piezoelectric plates is measured over the connecting lead. The voltage occurs only when the mechanical loads in the two plates are opposed, e.g., in the case of an excited flexure vibration. Disburbing vibrations of the clamping holder which stress both plates in the same sense produce no signal.

Figure 3:
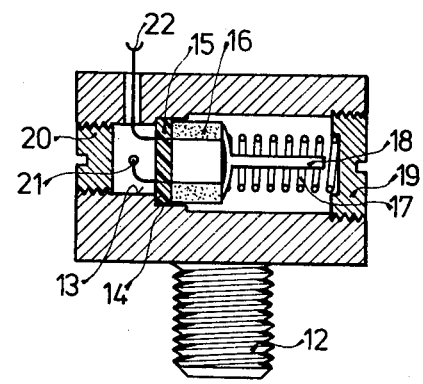
FIG. 3 is a cross-sectional view, partly schematic of a sensor according to the invention housed in the head of a screw.

Another sensor is shown in FIG. 3 whch in inserted into a transverse bore of the head of a cylinder head screw 12 of an internal combustion engine. The cylinder head screw 12 has a transverse bore 13 of which the diameter is reduced in the left-hand third of its length, as shown in FIG. 3. Against the step 14 of this reduction, a disc-shaped insulating plate 15 is laid as the first clamp jaw and a tubular piezoelectric element 16 is then laid against the disc 15. The tabular element 16 has a somewhat smaller diameter than the transverse bore at this position. A helical spring 17 presses the spreading foot of a vibrating rod 18 against the end of the tubular piezoelectric element 16, thus serving as the second clamping member. A screw 19 inserted in the end threads of the transverse bore provide an abutment for the spring 17. The opposite (narrower) end of the transverse bore is likewise closed off by a screw 20 inserted in screw threads.

Figure 4:
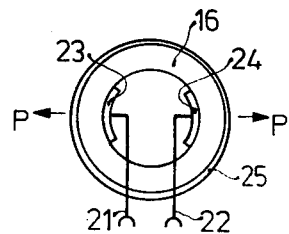
FIG. 4 is a diagrammatic axial end view of the piezoelectric element of the sensor according to FIG. 3

Two fine lead wires 21,22 are connected to the piezoelectric element and are both insulated and brought out in a common bore in the screw head. Here again, the sum of two piezoelectrically generated voltages is measured. The flexure vibrations produce a signal proportional to the flexure moment. Instead of the tubular piezoelectric element 16, it is also possible to use two separate piezoelectric ceramic rods. In FIG. 4, in the piezoelectric element 16, located in a sensor as shown in FIG. 3 is illustrated from the front end, the right-hand end, in FIG. 3. On the internal surface of the cylindrical element 16, compact electrodes 23 and 24 are applied to which the fine wires 21 and 22 are fastened. The counter-electrode 25 extends integrally over the entire outer surface.

The flexure vibrator 18 is interchangeable. It is easily replaced by loosening the screw 19 so that flexure vibrators of different frequencies and dimensions can be used. The transfer of the bending moment of the flexure vibrator 18 at the clamping location to the piezoelectric ceramic element 16 takes place in such a manner that the element 16 is stressed in the longitudinal direction by pressure or release from pressure periodically. The piezoelectric-measured voltage can be picked off by the conductors 21 and 22. For damping of the system, it is desirable, before closing up the bore 13 with the screw 19 or the screw 20, to fill the remaining empty space of the bore 13 with a damping medium, for example, oil.

By shifting the reed in its clamp, in the case of a sensor according to FIG. 1 or FIG. 2, the resonance frequency can be optimized. In the device according to FIG. 3, the optimization of the resonance frequency is possible by interchanging rod vibrators 18 of different sizes. Another possibility for tuning to the desired resonance frequency, is the provisions of perforations or of weights in or on the reeds. By corresponding dimensioning of the sensor, it is possible in this manner to selectively detect the engine knock noises so that disturbing signals outside of the frequency range of the engine knock noise is already attenuated or largely suppressed upon pickup, or even no longer picked up by the sensor.

Although the invention has been described with reference to particular illustrative embodiments, it will be understood that further variations and modifications are possible within the inventive concept.

We claim:

1. A sensor for detecting oscillations in an internal combustion engine resulting from engine knocks, comprising:
   a tubular body (16) of piezoelectric material having a pair of electrodes (23,24) on diammetrically opposite longitudinal patches of a first cylindrical surface of said tubular body and a counter-electrode on a second cylindrical surface of said tubular body;
   a casing having an internal cylindrical opening for receiving said piezoelectric body, said casing having an internal stop portion (13,14) for holding said tubular body against axial movement;
   means (15) for insulatingly and supportingly spacing said tubular body from said stop portion (13,14) of said casing;
   a flexure vibration member (18) having a free end extending from a base portion, said base portion having oppositely directed lateral extensions for dynamically connecting vibratory motion of said free end differentially as pressure variations to two diametrically opposite portions of the end of said tubular body (16) opposite from the end thereof supported by said spacing means (15);
   a compression spring (17) for pressing said lateral extensions of said vibration member (18) against said end portions of said tubular body (16), and
   means (19) held on said casing (25) for compressing said spring (17) against said lateral extensions of said vibration member.

2. A sensor according to claim 1, in which said tubular body of piezoelectric material is made up of two substantially semi-cylindrical portions polarized in opposite directions.

3. A sensor according to claim 1, in which said spring is a helical spring.

4. A sensor according to claim 1, in which said stop portion (13,14) of said sleeve-like casing provides an annular shoulder for seating said spacing means and thereby also said tubular body.

5. A sensor according to claim 1, in which said flexure vibrating member (18) is made of spring steel.

6. A sensor according to claim 1, in which said casing is provided by an engine part of said internal combustion engine having a bore (13) for housing other components of said sensor, said bore being shaped to provide said stop portion (14) for holding said tubular body against axial movement.

7. A sensor according to claim 6, in which said engine part is a cylinder head screw (12) of an internal combustion engine having a sufficiently large screw-head to contain said bore (13).

8. A sensor according to claim 6 or 7, in which said bore (13) of said engine part is filled, to the extent said bore is not occupied by components of said sensor, with a damping liquid and is sealed at both ends to contain the same.

* * * * *